Dec. 25, 1956     O. SUTER ET AL     2,775,043
INCLINATION RECORDING INSTRUMENT
Filed Sept. 14, 1950     3 Sheets-Sheet 1
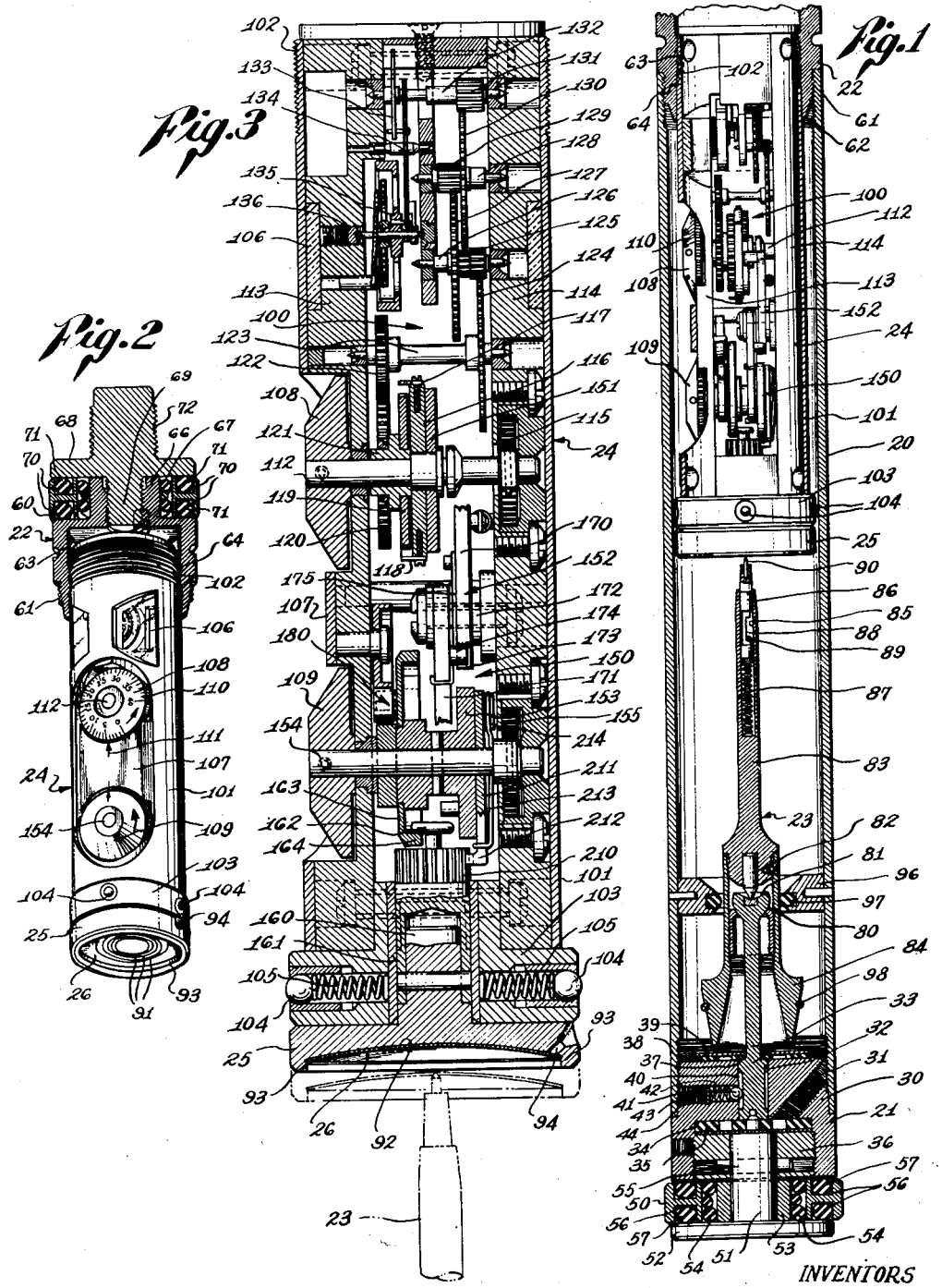
INVENTORS
OSWALD SUTER
ALFRED J. ABS
By Fulwider & Mattingly
Attorneys Dec. 25, 1956  O. SUTER ET AL  2,775,043
INCLINATION RECORDING INSTRUMENT
Filed Sept. 14, 1950  3 Sheets-Sheet 2
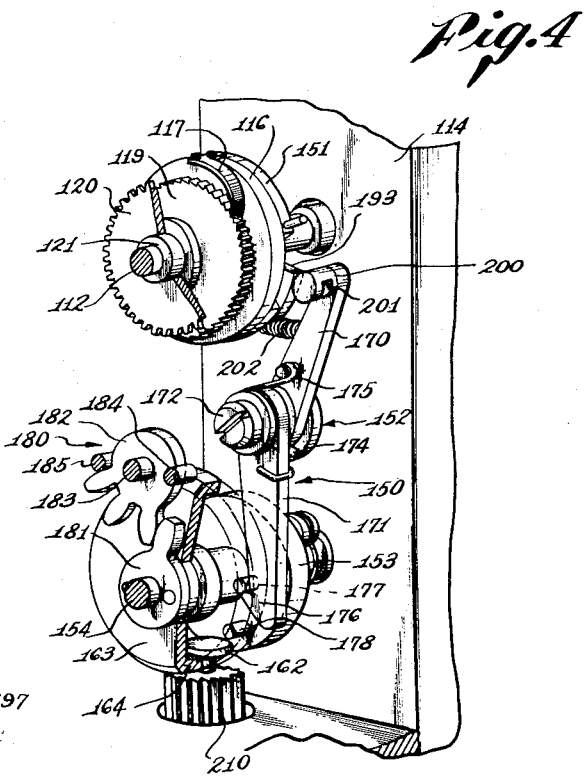
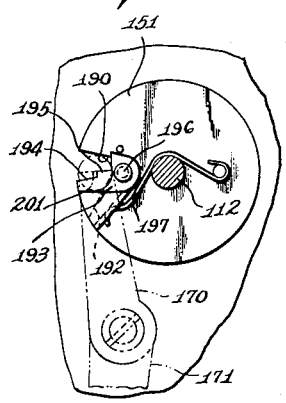
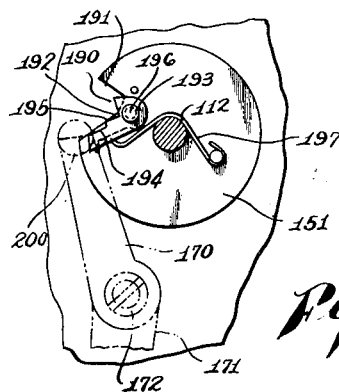
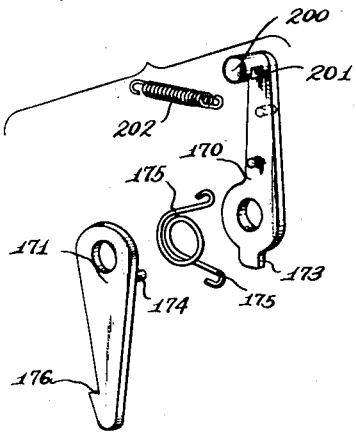
INVENTORS
OSWALD SUTER
ALFRED J. ABS
BY Fulwider & Mattingly
Attorneys

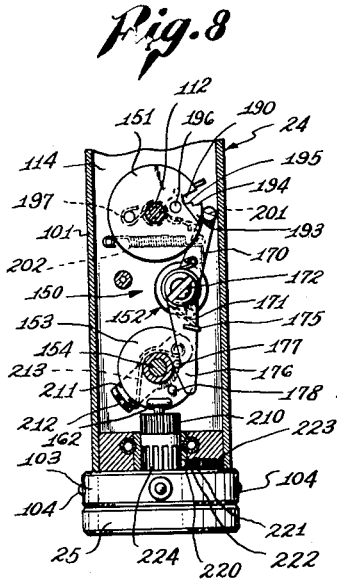
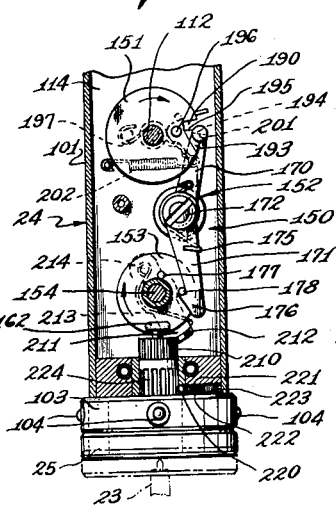
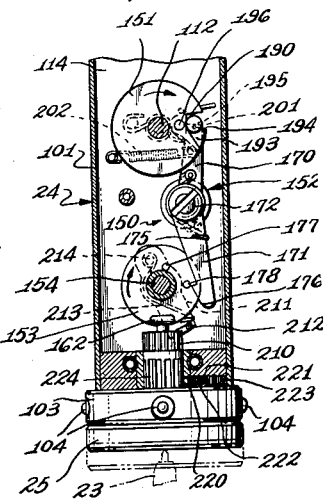
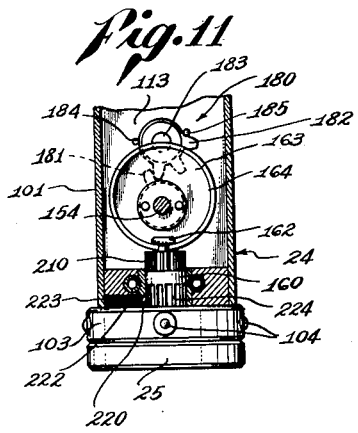
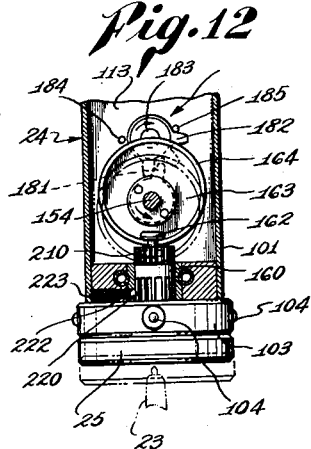
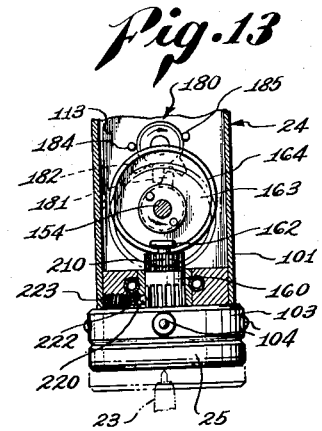
INVENTORS
OSWALD SUTER
ALFRED J. ABS
BY
Fulwider & Mattingly
Attorneys United States Patent Office 2,775,043
Patented Dec. 25, 1956

2,775,043

INCLINATION RECORDING INSTRUMENT

Oswald Suter, Los Angeles, and Alfred J. Abs, Van Nuys, Calif., assignors to Technical Oil Tool Corporation, Ltd., Los Angeles, Calif., a corporation of California Application September 14, 1950, Serial No. 184,876

17 Claims. (Cl. 33—205.5)

Our invention relates generally to surveying instruments for use in well bores, and more particularly to an improved drift or inclination recording instrument for determining the deviation of the well bore from the vertical.

The instrument embodying our invention is a mechanically actuated drift recorder of the general type shown in the patent to Culbertson No. 2,109,690, issued March 1, 1938. The present invention includes means for providing multiple readings on a single record or chart, as contrasted to the use of separate charts and multiple aligned recorders as in the Culbertson apparatus. By the use of the present invention, a simplified and more compact structure is provided without sacrificing the accuracy or reliable operation of the recorder.

A primary purpose of multiple recordation is to compare readings taken on separate aligned instruments, or on a single instrument at closely spaced time intervals, to check whether or not the pendulum and angle marking means was in a condition of equilibrium so as to give a true reading of the well bore deviation. If the angles marked are unequal, oscillation or misalignment of the pendulum means is indicated, and in either case the information is not used in further calculations. The most likely sources of error are allowing insufficient time for the instrument to reach bottom and come to a position of rest, or fluid movement within the well bore. In some cases the instrument may be damaged due to dirt in the mechanism, or shock, so that it cannot record accurately. Whatever the cause of error, a positive check is highly desirable because of the necessary reliance which must be placed on the determinations of drift, and the expense and difficultly of conducting drilling operations.

Accordingly, it is a major object of our invention to provide an improved drift or inclination recorder which will accurately record the deviation of the well bore from the vertical, and which may be used under the most severe operating conditions.

Another object of our invention is to provide an inclination recorder in which multiple readings are made by successive engagements between a chart and an angle marker.

It is also an object of our invention to provide a recorder having means for indexing or rotating the chart between the cycles of operation to space the chart impressions, that they may be more accurately determined and compared.

A further object of our invention is to provide a recorder in which the driving means move the chart into and out of engagement with the angle marker with a positive and uniform stroke.

Yet another object of our invention is to provide means for positively connecting the driving means and chart holder to prevent accidental movement of the latter.

Still another object of our invention is to provide a recorder having improved shock-resisting qualities which insure a high degree of accuracy over the entire life of the instrument.

These and other objects and advantages of our invention will become apparent from the following detailed description of a preferred form thereof, and from an inspection of the accompanying drawings, in which:

Fig. 1 is a longitudinal section of our improved inclination instrument with the upper cap portion broken away;

Fig. 2 is a perspective view of the recording element with the upper cap portion engaged thereon, and shown in section;

Fig. 3 is an enlarged longitudinal section of the recording element taken at right angles to the view of Fig. 2;

Fig. 4 is a fragmentary perspective view of the operating mechanism;

Fig. 5 is a detail of the timing cam and latch means shown in the released position;

Fig. 6 is a detail of the timing cam and latch means during the resetting operation;

Fig. 7 is an exploded view of the latch member;

Figs. 8, 9 and 10 are partial sectional views of the lower portion of the recording element, showing the details of the release disk and latch arm in initial, intermediate and final positions; and Figs. 11, 12 and 13 are partial sectional views taken in opposite directions to the views of Figs. 8, 9 and 10, respectively, showing the corresponding positions of the stop mechanism and driving means.

Referring now to the drawings, and particularly to Fig. 1 thereof, the numeral 20 designates an elongated tubular housing which contains the operating elements of the instrument. The housing 20 is closed at its lower end by a base member 21 and at its upper end by a cap member 22, which are flanged outwardly to center the housing within an outer protective shell (not shown). In operation, the outer shell is dropped or lowered within a well bore to position the housing 20 in alignment with the axis of the well bore.

In the lower portion of the housing 20 is a pendulum means or angle marker 23 which maintains itself in an upstanding vertical position, pivoting as the housing is inclined in accordance with the direction of the well bore. As can be understood, the upper end of the angle marker 23 is offset from the axis of the housing 20 an amount which is proportional to the angular inclination or deviation of the well bore from the vertical. Suspended above the angle marker 23 is a recording means or element 24 which controls the sliding movement of a chart holder 25 mounted on the lower end thereof. The chart holder 25 carries a disk-like chart 26 in coaxial alignment with the housing 20 and normally spaced above the angle marker 23.

The recording element 24 releases the chart holder 25 at predetermined time intervals, and the latter carries the chart 26 into engagement with the angle marker 23, and then returns to its normal position. During each cycle of operation, a mark is made on the chart 26 which provides a record of the inclination of the well bore. As will later be described, the chart holder 25 is rotated or indexed between cycles so as to separate and space apart the readings made on the chart 26.

The base member 21 closes the housing 20 and supports the angle marker 23 centrally therein. Preferably, the base 21 has an upper threaded hub 30 to engage and seal firmly with internal threads 31 on the housing 20. A central bore 32 is formed in the base 21 to slidably contain a rod or stem 33 which extends upwardly and supports the angle marker 23. The lower portion of the base 21 has an enlarged opening or recess 34 containing a resilient disk 35 which is held upwardly against the stem 33 by a plug 36. At the top of bore 32, the stem 33 is reduced in diameter to define a small shoulder 37 on which an upper resilient disk 38 is seated. The disk 38 is held downwardly by a split plate 39 which is fitted around the stem 33 and suitably connected to the base 21. The disks 35 and 38 yield to allow a slight longitudinal movement of the stem 33, which prevents shocks from being transmitted upwardly to the angle marker 23.

On the lower portion of stem 33 is a peripheral eccentric groove 40 which engages with a spring detent means 41 to resist relative rotation. The detent means 41 may be formed as a ball confined within a transverse bore 42 cut into the base 21, and is urged inwardly by a spring 43 and adjustment screw 44. The ball 41 is pressed firmly against the wall of the groove 40, and the latter is of substantial width so as to remain in contact therewith during any longitudinal movement of stem 33.

The plug 36 fitted into the lower end of base 21 is preferably built up to provide a resiliently mounted flange or collar 50 which projects outwardly to absorb any lateral shocks that would otherwise be transmitted to the housing 20. Extending centrally through the plug 36 is a shaft 51 having a lower plate-like head 52. A collar 53 abuts the head 52 and provides a seat for a plurality of resilient rings 54 which support the flange 50. The upper portion or body of plug 36 is removably mounted on shaft 51 to allow replacement of the rings 54, and is held in place by means, such as a pin 55. The rings 54 have a circular cross-section such as the conventional O-rings, and are held in side-by-side relationship, being compressed between plug 36 and head 52, to provide a firm seat for the flange 50. The upper and lower faces of flange 50 may be formed with annular grooves 56 to support a pair of resilient members 57. The members 57 may also be of the O-ring type, and bear firmly against plug 36 and head 51 to prevent free rotation of the flange 50.

The upper cap member 22 is built up similarly to the base member 21, and provides an outer resiliently mounted flange or collar 60 as is best seen in Fig. 2. The lower portion of cap 22 is threaded externally at 61 to engage and seal with threads 62 formed on the housing 20. Within the cap 22 is a bottom recess 63 threaded internally at 64 to engage the upper end of recording element 24, and rigidly support the latter within the housing 20. As is seen in Fig. 2, the cap 22 and recording element 24 may be removed as a unit from the housing 20 for setting of the mechanism prior to the operation of the device.

The upper portion of cap 22 is reduced in diameter to form a hub 66 providing a seat for a plurality of resilient rings 67 supporting the flange 60. Above the flange 60 is a plate-like cover 68 having a central threaded screw 69 engaged in member 22. The flange 60 may have upper and lower annular grooves 70 containing resilient rings 71 to bear against cover 68 and member 22 to prevent free rotation of the ring. Extending upwardly from cover 68 are means, such as a stud 72, to connect the entire assembly with a hydraulic shock absorber or the like, which is in turn supported within an outer protective shell. The latter elements (not shown) may be of the type disclosed in the aforementioned Culbertson patent.

Returning to the interior of the housing 20, it will be seen that the upper end of supporting stem 33 terminates in a curved seat or bowl 80 having an inverted conical interior surface 81. The pendulum means or angle marking element 23 is pivotally supported at the apex of the surface 81 by a downwardly projecting pin 82 embedded in an upper element body 83. A dependent, weighted skirt 84 is secured to body 83 and surrounds the seat 80 and stem 33 to freely maintain the angle marker in an upstanding vertical position. At the top of body 83 is an axial bore 85 containing a slidable plunger 86. A suitable spring means 87 is confined within the bore 85 and urges plunger 86 upwardly. On the side of the plunger 66 is a slotted portion 88 which cooperates with a stop pin 89 secured in body 83 to limit the travel of the plunger. A pointed marker or pricker 90 is embedded in the top of plunger 87 for engagement with the chart 26.

At predetermined time intervals the chart 26 is moved downwardly by holder 25 to engage with marker 90. Each engagement of the chart 26 and marker 90 makes an impression which indicates the angle or deviation of the well bore from the vertical measured by the displacement of the angle marker 23 from the center of the chart 26. The chart 26, as may best be seen in Figs. 2 and 3, is preferably of paper or soft metal and has printed thereon a series of concentric rings 91 to indicate the degrees of inclination. In order that chart 26 may be held firmly in place, it is made slightly oversize and flexed to snap into a concave seat 92 formed on the bottom of the chart holder 25. A retaining lip 93 confines the edges of the chart 26, and on the side of holder 25 is a relief opening 94 which permits the entrance of a pointed instrument so as to push the chart outwardly and facilitate its removal.

As can be readily understood, the plunger 86 is yieldable under pressure so as to prevent injury to the delicate pivot pin 82 during the engagement of the marker 90 and chart 26. To further protect the pivot 82 from injury, an annular buffer 96 is mounted in the container 20 surrounding the seat 80. The buffer 96 is spaced from the skirt 84 to allow relative pivoting and rotation, but is sufficiently close to prevent any lateral movement thereof. On the inner edge of buffer 96 is a compressed resilient ring 97 which cushions contacts between the buffer and the skirt 84. Surrounding the lower portion of the skirt 84 is a similar resilient ring 98 which cushions any contact of the skirt with the side wall of container 20. By the use of such resilient mounting means throughout the suspension of the angle marker 23, it is virtually impossible to impair its free pivoting characteristics which, as can be understood, are critical in obtaining accurate readings.

The recording element 24 includes a timing means 100 in its upper portion, and operating means 150 in its lower portion which cooperate to reciprocate the chart holder 25 into and out of engagement with the angle marker 23. The timing means 100 controls the release of the operating means 150 and has set therein a predetermined time interval. During the elapse of the chosen interval, the instrument is lowered to the desired position within the well bore. Upon release by the timing means 100, the operating means 150 completes one cycle or reciprocation and causes a first mark or impression to be made on the chart 26. Shortly thereafter, the timing means 100 makes a further release of the operating means 150 to complete a second reciprocation of the chart holder 25, thus making a separate impression on the chart 26.

Prior to the engagement of chart 26 with the angle marker 23 in the second cycle, the operating means 150 rotates or indexes chart holder 25 about the axis of the housing 20 so that the second impression is circumferentially spaced from the first, but should be an equidistance from the center of the chart. By comparison of the first and second marks a positive check is made on the accuracy of the instrument. If the angle marker 23 remained at rest during both operating cycles, the marks will be exactly the same distance from the center of chart 26. If the marks are not equidistant an error is indicated that was caused either by an oscillation of angle marker 23, or by a damaged suspension thereof. In this event a re-run of the instrument is made, and the erroneous marks are not used in further calculations.

As seen in Fig. 2, the recording element 24 is preferably formed with a generally cylindrical case 101 having a threaded upper portion 102 to engage with the internal threads 64 of cap member 22. The lower end of case 101 is connected to a disk or flange 103 which slidably supports the chart holder 25. Suitable centering guides 104 are spaced about the periphery of flange 103 to exactly center the case 101 within housing 20. The guides 104 may be formed as balls or detents urged outwardly by compressed spring means 105 confined within radial guide slots formed in the flange 103, as is seen in Fig. 3.

Extending longitudinally along the front face of case 101 is a recessed portion which exposes a flat panel 107. The panel 107 supports an upper winding and setting knob 108 for controlling the timing means 100. Spaced below knob 108 is a similar knob 109 connected to the operating means 150, as will later be described. The timing knob 108 carries a series of radial graduations 110 calibrated in minutes of time through an interval of approximately one hour. The desired time interval is set into the timing means 100 by rotating knob 108 counterclockwise as viewed in Fig. 2. The graduation 110 is brought opposite a fixed index mark 111 on the panel 107 to cause an equal angular rotation of a transverse main setting shaft 112 on which the knob 108 is affixed. Above knob 108 is a transparent window 106 sealed in the case 101 to provide a view of timing means 100. After the correct time interval has been set, the operator may observe the escapement and balance mechanism of the timing means 100 to insure that the same is properly functioning.

Mounted within the case 101 is a front frame or plate 113, the outer face of which forms the panel 107, and a back plate 114 to provide a rigid framework for supporting the timing means 100 and operating means 150. As is best seen in Fig. 3, plates 113 and 114 are spaced apart and provided with spaced parallel interior surfaces which define an elongated rectangular chamber. The setting shaft 112 extends transversely through frames 113 and 114 and is rotatably journaled therein. Encircling the back portion of shaft 112 is a coiled main spring 115 that is confined within a recess in plate 114. One end of spring 115 is secured to the shaft 112 and the other end is suitably connected to plate 114 so that it is tensioned or wound by rotation of the shaft. The knob 108 is turned in the counterclockwise direction, as viewed in Fig. 2, for winding the spring 115 which immediately commences to drive shaft 112 in the opposite or clockwise direction back to its initial position.

A ratchet clutch 116 is mounted on the shaft 112 for engagement with an upper escapement during the unwinding of spring 115, to regulate the rotational movement of the shaft back to the zero position. The clutch 116 is formed as a disk with a pair of overhanging spring pawls 117 and 118 mounted on the periphery thereof to engage with a ratchet-toothed gear 119, as is best seen in the detail of Fig. 4. During setting, when shaft 112 is rotated counterclockwise to wind spring 115, the pawls 117 and 118 slide over gear 119 and no motion is transmitted to the escapement.

The escapement mechanism and balance wheel may be of conventional design, and the form described herein is merely typical of a suitable type. The ratchet gear 119 is positively connected to a coaxial escapement gear 120 by means of a hub or bushing 121 which rotatably journals both gears on the shaft 112. A pinion 122 meshes with escapement gear 120 and is affixed near the front end of a transverse shaft 123 rotatably supported in plates 113 and 114. Near the back end of shaft 123 is a large spur gear 124 meshing with an upper pinion 125. A second parallel shaft 126 supports the pinion 125 and a forward spur gear 127. A third parallel shaft 128 carries a rear spur gear 130 and a forward pinion 129 meshing with spur gear 127. The spur gear 130 in turn meshes with a pinion 131 mounted on an upper shaft 132.

A conventional escapement wheel 133 is secured on the front end of the upper shaft 132 and engages through a suitable lever arm 134 with a balance wheel 135 for controlling the oscillating period. Throughout the escapement suitable jeweled bearings, as indicated at 136, may be provided to insure a high degree of accuracy and uniform timing rate, by preventing frictional losses in the aforementioned shafts and gearing. As can be understood, the entire purpose of the timing means 100 is to control the rotation rate of the main shaft 112 under the urging of the spring 115. For this reason various modifications of design are possible, although the preferred form of timing means shown has proven very satisfactory under the severe operating conditions encountered.

Rotation of shaft 112 under the urging of spring 115 effects rotation of a generally circular timing cam 151 which forms the first element of the operating means 150. The cam 151 is mounted on shaft 112 and is connected to the rear face of clutch disk 116 for positive rotation therewith. As shaft 112 returns to the initial or zero position, the cam 151 rotates to permit pivotal movement of a latch means 152 riding thereon.

The latch means 152 is in turn connected to a lower release disk 153 that is fixed on a transverse main driving shaft 154. The frame plates 113 and 114 journal shaft 154 which extends outwardly through the forward frame plate and connects with the previously mentioned lower winding knob 109. Affixed to the rear end of main shaft 154 is a coiled driving spring 155 which is mounted within a recess in the rear plate 114 and has outer end secured thereto. Rotation of knob 109 counterclockwise as viewed in Fig. 2, causes shaft 154 to rotate and wind spring 155. The knob 109 is turned through two full revolutions, at which time shaft 154 engages a positive stop and further rotation is impossible.

After the main shaft 154 is fully wound, the latch means 152 engages release disk 153 and prevents reverse rotation of the shaft under the urging of spring 155. Upon the elapse of the predetermined time interval set into timing means 100, the timing cam 151 allows a pivotal movement of latch 152 to free release disk 153 for a single revolution. A short time later latch means 152 makes a further pivotal movement and release disk 153 is freed for a second single revolution under the urging of spring 155.

Each revolution of main shaft 154 drives chart holder 25 through a complete cycle of engagement with and withdrawal from the angle marker 23. As can best be seen in Fig. 3, the chart holder 25 is formed with a stem 160 extending upwardly from the enlarged circular body portion holding the chart 26. The stem 160 is slidably and rotatably mounted in a journal or sleeve 161 which is fitted within the flange member 103. At the top of stem 160 is a headed driving pin 162 that is spaced a short distance below main shaft 154. The shaft 154 carries a circular driving cam 163 which is eccentrically mounted on the shaft for rotation therewith. The cam 163 is formed with a rearwardly extending peripheral flange 164 which interlocks between the head of pin 162 and stem 160 to force sliding movement of the chart holder 25 upon rotation of shaft 154.

The exact relationship between the driving flange 164 and pin 162 is seen in the enlarged detail of Fig. 4. The pin 162 is formed with a circular head which allows it to rotate about the axis of stem 160, while the driving flange 164 is formed as an annular rim having sufficient clearance between the stem 160 and pin 162 so that cam 163 is freely rotatable with shaft 154. Nevertheless, stem 160 is locked against sliding movement within the journal 161 until cam 163 is rotated, since pin 162 cannot override the annular flange 164.

Upon revolution of shaft 154, cam 163, because of its eccentricity with respect thereto, causes a vertically reciprocating or sliding movement of stem 160 and chart holder 25, as is best seen in Figs. 11 to 13. One revolution of disk 163 drives the chart holder 25 into engagement and withdrawal from the angle marker 23. The engaged position of chart holder 25, and eccentric position of driving cam 163 are shown by the phantom outline of Fig. 12. The movement of chart holder 25 effects a first mark or record on chart 26 to indicate the inclination of the well bore from the vertical. When shaft 154 makes a second revolution, the driving cam 163 again drives chart holder 25 through a reciprocating cycle of engagement and withdrawal from the angle marker 23 to effect a second mark or record on the chart 26, the second position of engagement being shown in the phantom outline of Fig. 13. The operation of the device thus provides the desired double reading for the purposes of comparison. As will later be described, the chart holder 25 is rotated or indexed about the axis of stem 160 at the start of the second cycle to circumferentially separate the marks on the chart 26.

It is important to note that at all times prior to the release of main shaft 154, and after the second revolution thereof, the chart holder 25 is positively locked in a position spaced from angle marker 23. No accidental sliding movement of chart holder 25 can take place because of the positive engagement between driving cam 163 and drive pin 162. Thus, there is no possibility of extraneous marks or records being made on chart 26 even though a severe shock or jar be delivered to the device.

The latch means 152 which releases disk 153 is disposed between the latter and the timing cam 152, as is best seen in Fig. 4. The latch means 152 comprises an upper latch arm 170 and a lower latch arm 171 mounted coaxially on a transverse pivot pin 172, securely fastened to the rear frame plate 114. The upper latch arm 170 carries a lower dog or pawl 173 that bears against a pin 174 extended from lower latch arm 171. The disposition of dog 173 and pin 174 is such as to lock arm 171 to arm 170 for counterclockwise rotation as viewed in Fig. 4 or 7. A spring 175 is coiled between the arms 170 and 171 to urge the same into substantially opposed positions in which the dog 173 is engaged firmly on pin 174. The spring 175 is yieldable to allow clockwise movement of upper arm 170 relative to lower arm 171 during the resetting operation.

On the end of lower arm 171 is a hook or catch 176 adapted to engage on either of a pair of spaced pins 177 and 178 extended from the side of release disk 153. The pin 177 is closer to the axis of disk 153 than is pin 178, as is best seen in Figs. 8 to 10. The pin 177 may be designated as the first or inner-release pin, while the pin 178 will be referred to as the second or outer-release pin. After spring 155 has been wound, the release disk 153 is rotated to the position shown in Fig. 8, with catch 176 engaged on inner pin 177. The disk 153 is urged to rotate in the clockwise direction by spring 155, but such rotation is prevented until the lower latch arm 171 is pivoted free of the pin 177. Hence, the driving cam 163 cannot rotate and the chart holder 25 is positively locked against sliding movement.

When latch means 152 is pivoted, the latch arm 171 moves slightly to the right or outwardly, as seen in Fig. 8. The movement of latch arm 171 releases pin 177 from the catch 176, and release disk 153 rotates clockwise through substantially a full revolution to the position shown in Fig. 9. The outer pin 178 then engages catch 176 and prevents further rotation. As shaft 154 rotates, the driving cam 163 is also rotated to cause a reciprocating cycle of chart holder 25. After a short time interval, the latch means 152 is pivoted further to the right to release pin 178 from catch 176. The disk 153 then makes a second revolution, and the previously described second reciprocation of the chart holder 25 takes place. The final or release position of lever arm 171 and catch 176 is shown in Fig. 10, in which the catch is free from the path of both pins 177 and 178.

To prevent overwinding of the spring 155 a positive stop means 180 is connected to shaft 154. The stop means 180 permits exactly two revolutions of shaft 154 from the unwound to wound position. Conversely, the stop means 180 will not allow shaft 154 to rotate beyond its zero position when unwinding. As is best seen in Fig. 4, a single toothed gear or lever 181 is mounted on shaft 154 forwardly of the driving cam 163. Above the stop lever 181 is a sector gear 182 pivotally mounted on a transverse shaft 183. Pivotal movement of sector gear 182 is limited by a pair of spaced stop members or pins 184 and 185 which are adapted to abut the terminal teeth of the sector gear to limit rotation in either direction.

As can be understood, a complete revolution of lever 181 moves the sector gear 182 through an arc equivalent to the spacing of adjacent teeth. Therefore, during the two revolutions of shaft 154, the sector gear 182 moves through an arc equal to the spacing of two teeth and must have exactly that amount of end clearance with the pins 184 and 185. Figs. 11 to 13 show the positions of the stop means 180 corresponding, respectively, to the positions of the release disk 153, shown in Figs. 8 to 10. In Fig. 11 the sector gear 182 has been pivoted counterclockwise into a wound position abutting stop pin 185. Since the sector gear 182 cannot override stop pin 185, further clockwise rotation of stop lever 181 engaged with the sector gear is prevented, and shaft 154 cannot be overwound. The engagement of release disk 153 with stop means 152 holds the shaft 154 against reverse or unwinding rotation. Hence, the driving cam 163 cannot rotate in either direction and accidental reciprocation of chart holder 25 is impossible.

When release disk 153 is freed by latch means 152 the shaft 154 makes substantially a complete revolution to the position shown in Fig. 12. The stop lever 181 has engaged sector gear 182 and will move the same in a clockwise direction upon any further rotation of shaft 154. In Fig. 13 a second revolution of shaft 154 is almost completed, and the lever 181 is engaged with sector 182 to move the same into engagment with stop 184. When sector 182 engages stop 184, further rotation of shaft 154 is prevented, and the latter will have completed exactly two revolutions from the wound position of Fig. 11. The stop means 180 is thus positively connected to shaft 154 at all times to limit its rotation. No engagement or disengagement takes place and the operation is foolproof to prevent damage to the instrument.

The pivotal movement of latch means 152 which unlocks the release disk 153 is controlled by timing cam 151. It will be remembered that the timing cam is rotated uniformly back to the initial or zero position by timing means 100. The predetermined time interval set into the timing shaft 112, winds spring 115 and determines the angular displacement of timing cam 151 from its zero position. On the edge of cam 151 is a camming notch 190 formed with a steep rear edge 191 and a shallow leading edge 192 as is seen in Fig. 6. The side of cam 151 carries a pivoted seer plate 193 which partially covers the notch 190 and is normally disposed, as is seen in Fig. 5, to overlap the shallow leading edge 192.

The effect of the seer plate 193 is to present a leading notch edge which is formed with an outer or first step 194 and an inner or second step 195. For purposes of resetting as will later be described, the seer plate 193 is pivotally mounted on a pin 196 affixed to cam 151 and is spring-urged into its normal position by a spring clip 197.

The upper latch arm 170 carries a cam follower 200 at its tip which rides on the periphery of timing cam 151. That portion of the cam follower in alignment with the edge of cam 151 is cylindrical, while an adjacent portion in alignment with seer plate 193 is recessed at 201 to provide a plane surface which is disposed substantially parallel to the step edges 194 and 195. The construction of cam follower 200 and its relationship to cam plate 151 and seer plate 193 can best be seen in the enlarged detail of Fig. 4.

When timing cam 151 has returned almost to its zero position, the upper latch arm 170 is held against pivoting by the engagement of cam follower 200 with the periphery of the timing cam as is seen in the view of Fig. 8. As cam 151 continues to rotate in a clockwise direction, the plane cam follower surface 201 subsequently drops or pivots into the first or outer notch 194 formed on seer plate 193. The upper arm 170 is at all times urged to pivot in towards cam 151 by a strong coil spring 202 secured to the arm and the rear frame plate 114 and consequently the cam surface 201 drops instantly into notch 194 when aligned therewith.

As the upper latch arm 170 pivots, the lower latch arm 171 also pivots to free catch 176 from the first release pin 177. The release disk 153 then makes a revolution and brings the second release pin 178 into engagement with the catch 176. Meanwhile, of course, the timing cam 151 is continuing to rotate towards the zero position. When the zero position is reached, the cam follower surface 201 aligns with the inner rear step 195 and drops therein to allow a further pivotal movement of the latch arm 170. This moves the lower latch arm 171 outwardly, and releases catch 176 from the second release pin 178. A second revolution of the release disk 153 then takes place. The time interval between the first and second release of disk 153 is governed by the circumferential width of the step 194 and is normally made quite short, on the order of twenty to thirty seconds.

During the previously described reciprocations of the chart holder 25, two marks are made on chart 26 by the angle marker 23. If the instrument is operating properly these marks will be at equal radial distances from the center of the chart 26. It is not desirable to superimpose the marks, and for this reason we provide means to rotate or index the chart holder 25 between the times of engagement with the angle marker 23. The marks are therefore circumferentially spaced with respect to each other and can be clearly distinguished.

The upper portion of chart holder stem 160 is formed as a ratchet toothed gear 210 that engages an indexing lever 211 for rotation of the chart holder 25. The indexing lever 211 is fixed on main drive shaft 154 and extends diametrically thereacross just rearwardly of stem 160, as is best seen in Fig. 3. On the working end of lever 211 are forwardly turned teeth 212 which mesh with gear 210 as the lever swings past during the rotation of shaft 154. The ratchet teeth of gear 210 are faced so as to be engaged with the teeth 212 upon unwinding of shaft 154. During the winding revolutions of shaft 154 the teeth 212 override ratchet gear 210 since no indexing of the chart holder 25 is then desired.

In order to prevent shearing of the lever teeth 212 upon sudden engagement with the gear 210, the lever 211 is loosely centered on the shaft 154 and is held in proper position by a spring 213. A pin 214 passes through lever 211 into release disk 153 and holds one end of the spring 213. The other end of spring 213 passes around the shaft 154 and is hooked to the working end of lever 211. Thus lever 211 is secured for rotation with shaft 154, but may pivot a slight amount against the tension of the spring 213 upon engagement of the teeth 212 with the gear 210.

The spring 213 also urges the lever 211 forwardly so that teeth 212 do not lie in a plane tangential with the root circle of gear 210 but are displaced forwardly as is best seen in Fig. 3. Upon engagement of teeth 212 with gear 210 the spring 213 yields to allow teeth 212 to ride arcuately around the periphery of the gear 210 and depart from the plane of rotation of the shaft 154. Thus, the gear 210 is driven through a larger angle of rotation by the teeth 212 than would be possible by engagement with rigidly positioned lever teeth. It can also be understood that during the winding operation, the spring 213 yields to allow lever 211 to override the ratchet teeth of gear 210.

The exact angle of rotation made by stem 160 is not critical since the purpose of such rotation is to separate the marks on the chart 26. It is desirable that chart 26 be turned through an arc which is either less than or greater than 180°. If the chart is turned through an exact angle of 180°, certain classes of eccentric errors may not appear because of the coplanar relationship of marks spaced 180° part. In the preferred form of indexing means, the angle of rotation of the chart holder is approximately 120°.

To prevent over-rotation of chart holder 25, or any spinning thereof during the engagement with angle marker 23, a friction detent 220 is provided to engage the stem 160. As is best seen in Figs. 8 to 10, the detent 220 is formed on a ball urged inwardly against the stem 160. A transverse bore 221 extends inwardly in the upper portion of the flanged base member 103, and the detent 220 is yieldably confined therein by a spring means 222 and adjustment screw 223. Ribs or longitudinal serrations 224 are formed on the surface of the stem 160 and ball 220 rides thereon with a click-like action.

The operation of the indexing means for rotation of the chart holder 25 may best be seen in Figs. 8 to 10. Prior to the release of pin 177 for the first cycle of rotation of shaft 154, the indexing lever 211 is in the position shown in Fig. 8. During the first cycle of operation the lever 211 does not engage gear 210 but merely rotates clockwise to the position shown in Fig. 9. When the second pin 178 is released by catch 176, the lever 211 swings the teeth 212 into engagement with gear 210 to rotate the stem 160 and chart holder 25. This engagement takes place almost immediately upon the commencement of the second cycle, a short travel of lever 211 being allowed to pick up momentum. Hence, as the chart holder 25 and chart 26 reach the bottom of the stroke for engagement with angle marker 23, the chart 26 has been indexed sufficiently to space the second mark circumferentially from the first.

We are thus able to provide two marks on the chart which are separate and distinct, each of which will be the same radial distance from the center thereof if the instrument is operating properly. After the instrument is withdrawn from the well bore, the chart is removed from the chart holder by placing a pointed tool in the relief opening 94 and forcing the chart out of the arcuate seat 92. The chart is then preferably placed in a magnifying reading glass and the position of the two marks relative to the concentric rings on the chart is ascertained. Since the marks are spaced apart they may be clearly distinguished and read. Furthermore, since there are two distinct marks, it is clear that the instrument has in fact recorded twice.

Setting the instrument for operation is very simple and is accomplished by winding the upper timing knob 108 and lower operating knob 109. Prior to setting, the timing cam 151 is in the zero position with latch arm 170 dropped into the inner notch 195. The lower latch arm 171 has pivoted to the right and is free from release disk 153, as shown in the position of Fig. 10.

Because of the position of the latch means 152 as just described, it is necessary to wind the timing knob 108 before attempting to wind the operating knob 109; that is, the latch means cannot be engaged on the release disk 153 until the arm 171 has pivoted inwardly to a position to engage the release pins 177 and 178, through the action of the cam follower 200 riding out of the zero position in notch 195 on seer plate 193. If the operator attempts to wind the operating knob 109 first, no harm will be done, but the release disk 153 will not engage, and drive spring 155 will consequently immediately drive shaft 154 back to the unwound position. The recording element 24 is, of course, removed from the housing 20 for setting, and consequently there is no danger of the chart holder 25 engaging the angle marker 23 during the setting operation.

As was previously described, winding the timing knob 108 rotates shaft 112 and winds the timing spring 115. The upper timing means 100 is then engaged through clutch 116 to regulate the rotation of shaft 112 back to the zero position and allow the elapse of the predetermined time interval. The action of timing cam 151 in lifting latch means 152 out of the seer notch 195 can best be seen in Figs. 5 and 6. In these views the cam plate 151 is rotated clockwise by shaft 112 to set the predetermined time interval. The zero notch 190 of the timing cam 151 is formed with the shallow leading edge 192 over which the cam follower 200 can ride. The steep notches 194 and 195 of the seer plate 193 are moved out of the way by yielding of the spring 197 so that there is no difficulty in forcing the cam follower 200 to ride up the inclined edge 192 and onto the periphery of the timing cam 151, as shown in Fig. 6.

Once the cam follower 200 is riding on the periphery of cam 151, the seer plate 193 immediately moves back into the overlapping position relative to notch 190, and is in a position to control the double release of the latch means 152. When cam follower 200 is positioned on the periphery of timing cam 151, the latch means 152 has pivoted inwardly and latch arm 171 is in the position shown in Fig. 8. It is now possible to wind the operating knob 109 and engage release disk 153 with latch arm 171.

During the double revolution of shaft 154 to wind the spring 155, the lower latch arm 171 may be moved out of the path of release pins 177 and 178 by the action of these pins riding on the tapered lower portion of catch 176. The latch spring 175 yields to allow momentary outward pivoting of arm 171 relative to arm 170, and there is no strain on the latching elements. When the inner pin 177 has made its second revolution past latch arm 171 into the position of Fig. 8, the spring 175 urges the latch arm inwardly to engage the catch 176 on the inner pin. The instrument is now ready for operation and the timing interval has commenced. The recording element is then secured in the housing 20 and the entire instrument lowered within the well bore. Upon the elapse of the timing interval, the timing cam is moved into a position for the cam follower surface 201 to drop into the first notch 194. This releases pin 177 and the release disk 153 makes a first revolution. The driving cam 163 also makes a revolution to reciprocate chart holder 25 through a cycle of engagement and withdrawal from the angle marker 23.

In a short time, the follower surface 201 drops into inner notch 195 to release the second pin 178 and allow the second revolution of the disk 153. The second revolution of driving cam 163 and reciprocation of the chart holder 25 then takes place. This effects the second marking of chart 26 and the operation of the device is complete. Upon withdrawal from the well bore, the chart 26 is removed from the instrument and the record of the well bore inclination from the vertical is ascertained.

We have described in some detail a preferred form of our apparatus which is positive and reliable in its operation, and which is completely capable of providing the aforementioned objects and advantages. It is to be understood, however, that many modifications of design and construction will be apparent to those skilled in the art, and we do not wish to be limited to the detailed description herein, except as defined in the appended claims.

We claim:

1. An inclination recording instrument for use in well bores, which includes: an elongated housing; pendulum means including a marking element suspended in said housing; a chart holder mounted for sliding and rotational movement within said housing and normally spaced from said pendulum marking element; operating means for reciprocating said chart holder through cycles of engagement and withdrawal from said marking element to record the relative angular displacement thereof; said operating means including latch means to control the release thereof, and stop means to limit the cycles of reciprocation; timing means operatively associated with said latch means and preventing movement thereof until the lapse of a predetermined time, then allowing a first movement to release said operating means for a first cycle of reciprocation, and subsequently allowing a second movement of said latch means to release said operating means for a second cycle of reciprocation; and means interconnected with said operating means and said chart holder to rotate said chart holder only between the cycles of engagement with said marking element whereby said chart holder is at rest when engaged with said marking element.

2. An inclination recording instrument for use in well bores, which includes: an elongated housing; pendulum means including a marking element suspended in said housing; a chart holder mounted for sliding movement within said housing and normally spaced from said pendulum marking element; operating means for reciprocating said chart holder through cycles of engagement and withdrawal from said marking element to record the relative angular displacement thereof; stop means engaged with said operating means for limiting the cycles of reciprocation, said stop means comprising a stop lever moved by said operating means and meshing with a sector gear confined between spaced stop members to positively limit the pivotal movement thereof; and timing means operatively associated with said operating means and preventing the release thereof until the lapse of a predetermined time, then releasing said operating means for a first cycle of reciprocation, and subsequently for a further cycle of reciprocation.

3. An inclination recording instrument for use in well bores, which includes: an elongated tubular housing; pendulum means including a marking element suspended on the axis of said housing; a chart holder mounted for sliding and rotational movement along the axis of said housing and normally spaced from said pendulum marking element; driving means including a drive shaft and spring means urging rotation of said shaft; a driving cam eccentrically mounted on said drive shaft and peripherally connected with said chart holder for reciprocating the same through cycles of engagement and withdrawal from said marking element; latch means to control the release of said drive shaft; timing means connected with said latch means and preventing movement thereof until the lapse of a predetermined time, then allowing movement of said latch means to release said drive shaft for a first revolution, and subsequently allowing a further movement of said latch means to release said drive shaft for a second revolution; and an indexing lever mounted on said drive shaft and rotatable therewith, said indexing lever being engageable with a gear formed on the upper portion of said chart holder, to rotate said chart holder during the cycles of reciprocation to space circumferentially the points of engagement of said chart holder and said marking element.

4. An inclination recording instrument for use in well bores, which includes: an elongated housing; pendulum means including a marking element suspended in said housing; a circular chart holder slidably and rotatably supported in said housing and having a stem formed with a headed driving pin; a drive shaft rotatably mounted to extend across said housing; spring means urging rotation of said drive shaft; a circular driving cam eccentrically mounted on said drive shaft and having a peripheral flanged rim disposed for interlocking rotatable connection with said driving pin to reciprocate said chart holder through cycles of engagement and withdrawal from said marking element; a release disk mounted on said drive shaft for rotation therewith; latch means engaging said release disk to hold said drive shaft against rotation, said latch means being movable to a position allowing a single revolution of said disk, and being further movable to a position allowing a second revolution of said disk; stop means engaged with said drive shaft to positively limit the revolutions thereof; timing means engaged with said latch means and preventing movement thereof until the lapse of a predetermined time, then allowing a movement of said latch means to release said drive shaft for a first revolution, and subsequently allowing a further movement of said latch means to release said drive shaft for a second revolution; and indexing means for rotating said chart holder during said cycles of reciprocation.

5. An inclination recording instrument for use in well bores, which includes: an elongated housing; pendulum means including a marking element suspended in said housing; a chart holder mounted for sliding movement within said housing and normally spaced from said pendulum marking element; driving means including a drive shaft and spring means urging rotation of said shaft; a driving cam eccentrically mounted on said drive shaft and peripherally connected with said chart holder for reciprocating the same through cycles of engagement and withdrawal from said marking element; timing means engaged with said latch means and preventing movement thereof until the lapse of a predetermined time, then allowing a movement of said latch means to release said driving shaft for a first revolution, and subsequently allowing a further movement of said latch means to release said driving shaft for a second revolution; a stop lever mounted on said drive shaft for rotation therewith; a sector gear meshing with said stop lever, and pivotally mounted for limited movement between said positive stop members; and an indexing lever mounted on said drive shaft and rotatable therewith, said indexing lever being engageable with a gear formed on the upper portion of said chart holder, to rotate said chart holder during the cycles of reciprocation to space circumferentially the points of engagement of said chart holder and said marking element.

6. An inclination recording instrument for use in well bores, which includes: an elongated tubular housing; pendulum means including a marking element suspended on the axis of said housing; a framework removably mounted within said housing and spaced from said pendulum marking element; a chart holder supported by said framework for sliding and rotational movement on the axis of said housing; a drive shaft rotatably mounted in said framework; spring means urging rotation of said shaft; a driving cam eccentrically mounted on said drive shaft and peripherally connected with said chart holder for reciprocating the same through cycles of engagement and withdrawal from said marking element; a release disk mounted on said drive shaft for rotation therewith; a latch lever pivotally mounted on said framework and engaging said release disk to prevent rotation of said drive shaft, said lever being pivoted to a first position releasing said disk for a single revolution, and being pivoted to a second position releasing said disk for further rotation; timing means engaged with said latch means and preventing movement thereof until the lapse of a predetermined time, then allowing a movement of said latch means to release said drive shaft for a first revolution, and subsequently allowing a further movement of said latch means to release said drive shaft for a second revolution; and an indexing lever mounted on said drive shaft and rotatable therewith, said indexing lever being engageable with a gear formed on the upper portion of said chart holder, to rotate said chart holder during the cycles of reciprocation to space circumferentially the points of engagement of said chart holder and said marking element.

7. In an inclination recording instrument: a removable framework; a chart holder mounted for sliding and rotational movement on said framework; a drive shaft mounted for rotational movement within said framework; spring means urging rotation of said drive shaft; a driving cam eccentrically mounted on said drive shaft and peripherally connected with said chart holder for reciprocating the same through cycles of sliding movement; a stop lever mounted on said drive shaft for rotation therewith; a sector gear engaging said stop lever and pivotally mounted for limited movement between stop members to limit the revolutions of said drive shaft; timing means for controlling the release of said drive shaft for intermittent cycles of operation; and an indexing lever mounted on said drive shaft and rotatable therewith, said indexing lever being engageable perpendicularly with a gear formed on the upper portion of said chart holder to rotate said chart holder during cycles of reciprocation.

8. An inclination recording instrument for use in well bores, which includes: an elongated tubular housing; pendulum means including a marking element suspended on the axis of said housing; a framework removably mounted within said housing and spaced from said pendulum marking element; a circular chart holder slidably supported in said framework for movement on the axis of said housing; a drive shaft rotatably mounted in said framework and extending laterally across said housing; spring means urging rotation of said shaft; a release disk mounted for rotation with said shaft and carrying inner and outer release pins extending from the side thereof; a latch lever pivotally mounted on said framework and having a catch engageable with said inner and outer release pins, said lever being normally engaged with said inner release pin to prevent rotation of said shaft and movable to a position releasing said inner pin and engaging said outer pin to allow a single revolution of said shaft, and being further movable to a position releasing said outer pin; a driving cam eccentrically mounted on said drive shaft and peripherally connected with said chart holder for reciprocating the same through cycles of engagement and withdrawal from said marking element upon rotation of said driven shaft; and timing means engaged with said latch lever and preventing movement thereof until the lapse of a predetermined time, then allowing movement of said lever to release said inner pin, and subsequently allowing a further movement of said lever to release said outer pin.

9. An inclination recording instrument for use in well bores, which includes: an elongated tubular housing; pendulum means including a marking element suspended on the axis of said housing; a framework removably mounted within said housing and spaced from said pendulum marking element; a circular chart holder slidably and rotatably supported in said framework in alignment with the axis of said housing, said holder having a stem formed with a headed driving pin; a drive shaft rotatably mounted in said framework and extending laterally across said housing; spring means urging rotation of said shaft; a release disk mounted on said shaft for rotation therewith; latch means engaging said release disk to hold said shaft against rotation, said latch means being movable to a position allowing a single revolution of said disk, and being further movable to a position allowing a second revolution of said disk; a circular driving cam eccentrically mounted on said drive shaft and having a peripheral flanged rim disposed for interlocking rotatable connection with said driving pin to reciprocate said chart holder through cycles of engagement and withdrawal from said marking element; timing means engaged with said latch means and preventing movement thereof until the lapse of a predetermined time, then allowing a movement of said latch means to release said drive shaft for a first revolution, and subsequently allowing a further movement of said latch means to release said shaft for a second revolution; a stop lever mounted on said drive shaft for rotation therewith; a sector gear engaging said stop lever and pivotally mounted for limited movement between stop members to limit the revolutions of said shaft; and indexing means rotatably mounted on said drive shaft and engageable with said chart holder stem for rotation thereof during the cycles of reciprocation to space the engagement points of said chart holder and said marking element.

10. An inclination recording instrument for use in well bores, which includes: an elongated tubular housing; pendulum means including a marking element suspended on the axis of said housing; a cylindrical framework removably mounted in said housing and centered axially therein; a circular chart holder slidably and rotatably supported in said framework in alignment with the axis of said housing, said holder having a stem formed with a gear portion spaced from said holder, and a terminal headed driving pin; a drive shaft rotatably mounted in said framework and extending laterally across said housing; spring means urging rotation of said shaft; a circular driving cam eccentrically mounted on said shaft and having a peripheral flanged rim disposed for interlocking rotatable connection with said driving pin to reciprocate said chart holder through cycles of engagement and withdrawal from said marking element; a release disk mounted on said drive shaft for rotation therewith; a latch lever pivotally mounted on said framework and engaging said release disk to prevent rotation of said shaft, said lever being pivotal to a first position releasing said disk for a single revolution, and being pivotal to a second position releasing said disk for further rotation; timing means engaged with said latch means to prevent movement thereof until the lapse of a predetermined time, then allowing a movement of said latch means to release said drive shaft for a first revolution, and subsequently allowing a further movement of said latch means to release said shaft for a second revolution; a stop lever mounted on said drive shaft for rotation therewith; a sector gear meshing with said stop lever, and pivotally mounted for limited movement between positive stop members; and an indexing lever spring mounted on said drive shaft and rotatable therewith, said lever being yieldably engageable with the gear portion of said chart holder stem to rotate said chart holder during the cycles of reciprocation, and angularly disposed to effect such rotation upon the commencement of the second cycle.

11. An inclination recording instrument for use in well bores, which includes: an elongated tubular housing; pendulum means including a marking element suspended on the axis of said housing; a cylindrical framework removably mounted in said housing and centered axially therein; a circular chart holder slidably and rotatably supported in said framework in alignment with the axis of said housing, said holder having a stem formed with a headed driving pin; a drive shaft rotatably mounted in said framework and extending laterally across said housing; spring means urging rotation of said shaft; a circular driving cam eccentrically mounted on said shaft and having a peripheral flanged rim disposed for interlocking rotatable connection with said driving pin to reciprocate said chart holder through cycles of engagement and withdrawal from said marking element; a release disk mounted for rotation with said shaft and carrying inner and outer release pins extending from the side thereof; a latch lever pivotally mounted on said framework and having a catch engageable with said inner and outer release pins, said lever being normally engaged with said inner release pin to prevent rotation of said shaft and movable to a position releasing said inner pin and engaging said outer pin to allow a single revolution to said shaft, and being further movable to a position releasing said outer pin; a timing shaft rotatably mounted in said framework and extending laterally across said housing; spring means urging rotation of said timing shaft; escapement means engaged with said timing shaft for controlling the rotation thereof; a timing cam mounted for rotation on said timing shaft, said cam peripherally contacting said latch lever to hold the same in engagement with said inner release pin, said cam having a double-stepped notch therein to allow pivotal movement of said latch lever to the position releasing said inner pin upon the lapse of a predetermined time, and subsequently to the position releasing said outer pin; and indexing means rotatably mounted on said driving shaft and engageable with said chart holder stem for rotation thereof during the cycles of reciprocation to space the engagement points of said chart holder and said marking element.

12. An inclination recording instrument for use in well bores, which includes: an elongated tubular housing; pendulum means including a marking element suspended on the axis of said housing; a cylindrical framework removably mounted in said housing and centered axially therein; a circular chart holder slidably and rotatably supported in said framework in alignment with the axis of said housing, said holder having a stem formed with a gear portion spaced from said holder, and a terminal headed driving pin; a drive shaft rotatably mounted in said framework and extending laterally across said housing; a coil spring connected between said framework and said shaft to urge rotation of the latter; a circular driving cam eccentrically mounted on said shaft and having a peripheral flanged rim disposed for interlocking rotatable connection with said driving pin to reciprocate said chart holder through cycles of engagement and withdrawal from said marking element; a release disk mounted for rotation with said shaft and carrying inner and outer release pins extending from the side thereof; a latch lever pivotally mounted on said framework and having a catch engageable with said inner and outer release pins, said lever being normally engaged with said inner release pin to prevent rotation of said shaft and movable to a position releasing said inner pin and engaging said outer pin to allow a single revolution of said shaft, and being further movable to a position releasing said outer pin; a timing shaft rotatably mounted in said framework and extending laterally across said housing; spring means urging rotation of said timing shaft; escapement means engaged with said timing shaft for controlling the rotation thereof; a timing cam mounted for rotation on said timing shaft, said cam peripherally contacting said latch lever to hold the same in engagement with said inner release pin, said cam having a double-stepped notch therein to allow pivotal movement of said latch lever to the position releasing said inner pin upon the lapse of a predetermined time, and subsequently to the position releasing said outer pin; a stop lever mounted on said drive shaft for rotation therewith; and an indexing lever spring-mounted on said drive shaft and rotatable therewith, said lever being yieldably engageable with the gear portion of said chart holder stem to rotate said chart holder during the cycles of reciprocation, and angularly disposed to effect such rotation upon the commencement of the second cycle.

13. An inclination recording instrument for use in well bores, which includes: an elongated housing; pendulum means including a marking element suspended in said housing; a chart holder mounted for sliding and rotational movement within said housing and normally spaced from said marking element; operating means for reciprocating said chart holder through cycles of engagement and withdrawal from said marking element to record the relative angular displacement thereof, said operating means including latch means to control the release thereof; timing means operatively associated with said latch means and preventing release thereof until the lapse of a predetermined time, and upon release of said operating means allowing successive cycles of reciprocation of said holder; and means interconnected with said operating means and said chart holder for periodically rotating said holder between successive contacts thereof with said marking element and limiting the rotation of said holder to that period when said holder is not in contact with said marking element.

14. An inclination recording instrument for use in well bores, which includes: a housing; pendulum means including a marking element suspended in said housing; a chart holder mounted for sliding and rotational movement within said housing and normally spaced from said marking element; operating means for reciprocating said chart holder through cycles of engagement and withdrawal from said marking element to record the relative angular displacement thereof; timing means to control the release of said operating means for intermittent cycles of reciprocation; and means interconnected with said operating means and said chart holder for periodically rotating said holder between successive contacts thereof with said marking element and limiting the rotation of said holder to that period when said holder is not in contact with said marking element.

15. An inclination recording instrument for use in well bores, which includes: a housing; direction indicating means including a marking element mounted for movement in said housing; a chart holder mounted for sliding and rotational movement within said housing and normally spaced from said marking element; operating means for reciprocating said chart holder through cycles of engagement and withdrawal from said marking element to record the relative angular displacement thereof; means to control the release of said operating means for intermittent cycles of reciprocation; and means interconnected with said operating means and said chart holder for periodically rotating said holder between successive contacts thereof with said marking element and limiting the rotation of said holder to that period when said holder is not in contact with said marking element.

16. An inclination recording instrument for use in well bores, which includes: an elongated housing; pendulum means including a marking element suspended in said housing; a chart holder mounted for sliding and rotational movement within said housing and normally spaced from said marking element; operating means for reciprocating said chart holder through cycles of engagement and withdrawal from said marking element to record the relative angular displacement thereof, said operating means including latch means to control the release thereof; timing means operatively associated with said latch means and preventing release thereof until the lapse of a predetermined time, then allowing a first movement to release said operating means for a first cycle of reciprocation, and subsequently allowing a second movement of said latch means to release said operating means for a second cycle of reciprocation; and means interconnected with said operating means and said chart holder for periodically rotating said holder between successive contacts thereof with said marking element and limiting the rotation of said holder to that period when said holder is not in contact with said marking element.

17. An inclination recording instrument for use in well bores, which includes: a housing; pendulum means including a marking element suspended in said housing; a chart holder mounted for sliding and rotational movement within said housing and normally spaced from said marking element; operating means for reciprocating said chart holder through cycles of engagement and withdrawal from said marking element to record the relative angular displacement thereof; means to control the release of said operating means for intermittent cycles of reciprocation; and means interconnected with said operating means and said chart holder for periodically rotating said holder between successive contacts thereof with said marking element and limiting the rotation of said holder to that period when said holder is not in contact with said marking element.

References Cited in the file of this patent

UNITED STATES PATENTS

| | | |
|---|---|---|
| 21,061 | Brooks | Aug. 3, 1858 |
| 604,010 | Judd | May 10, 1898 |
| 609,395 | Atwood | Aug. 16, 1898 |
| 616,674 | Hann | Dec. 27, 1898 |
| 1,138,785 | Porter | May 11, 1915 |
| 2,089,153 | Monroe | Aug. 3, 1937 |
| 2,109,690 | Culbertson | Mar. 1, 1938 |
| 2,189,560 | Culbertson | Feb. 6, 1940 |
| 2,205,729 | Monroe | June 25, 1940 |
| 2,257,996 | Baker | Oct. 7, 1941 |
| 2,334,950 | Opocensky | Nov. 23, 1943 |
| 2,624,952 | MacLagan | Jan. 13, 1953 |

FOREIGN PATENTS

| | | |
|---|---|---|
| 510,700 | France | Sept. 10, 1920 |